United States Patent
Matsumoto (10) Patent No.: US 8,291,507 B2
(45) Date of Patent: Oct. 16, 2012

(54) DOCUMENT MANAGEMENT SYSTEM, DOCUMENT MANAGEMENT METHOD AND COMPUTER PROGRAM

(75) Inventor: Yoshitaka Matsumoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 426 days.

(21) Appl. No.: 12/476,909

(22) Filed: Jun. 2, 2009

(65) Prior Publication Data

US 2009/0307782 A1 Dec. 10, 2009

(30) Foreign Application Priority Data

Jun. 6, 2008 (JP) .................. 2008-149796

(51) Int. Cl.
*G06F 21/00* (2006.01)
(52) U.S. Cl. .......... 726/28; 709/205; 709/214; 709/219; 715/229; 715/234; 726/27
(58) Field of Classification Search ....... 726/28
See application file for complete search history.

(56) References Cited

U.S. PATENT DOCUMENTS

| | | | |
|---|---|---|---|
| 5,590,266 A * | 12/1996 | Carson et al. ............ | 715/741 |
| 5,926,633 A * | 7/1999 | Takagi et al. ............ | 345/619 |
| 6,557,015 B1 * | 4/2003 | Bates et al. ............ | 715/229 |
| 7,379,978 B2 * | 5/2008 | Anderson et al. ........ | 709/219 |
| 7,516,420 B2 * | 4/2009 | Picon et al. ............ | 715/847 |
| 7,814,554 B1 * | 10/2010 | Ragner ................. | 726/27 |
| 8,086,570 B2 | 12/2011 | Kawabe et al. | |
| 2005/0034152 A1 | 2/2005 | Matsumoto et al. | |
| 2006/0212497 A1 * | 9/2006 | Tomita ................. | 707/205 |
| 2007/0162417 A1 * | 7/2007 | Cozianu et al. .......... | 707/1 |
| 2007/0186157 A1 * | 8/2007 | Walker et al. .......... | 715/530 |

FOREIGN PATENT DOCUMENTS

| | | |
|---|---|---|
| JP | 2006215665 A | 8/2006 |
| JP | 2007004649 A | 1/2007 |
| JP | 2007188490 A | 7/2007 |

OTHER PUBLICATIONS

PaperPort 12 Getting Started Guide| http://www.nuance.com/imaging/pdf/ug_PaperPort12UserGuide.pdf|NuanceCommunications, Inc.|2009.*

* cited by examiner

*Primary Examiner* — Thanhnga B Truong
*Assistant Examiner* — Mahfuzur Rahman
(74) *Attorney, Agent, or Firm* — Fitzpatrick, Cella, Harper & Scinto (57) ABSTRACT

When a shortcut of a document is generated, a user is caused to set the number of times of access to the shortcut. A shortcut identifier for identifying the shortcut is generated. The shortcut identifier and the number of times of access are registered in a shortcut management table in association with each other. Thereafter, the generated shortcut identifier and a mail address as a destination of a mail are set in the shortcut. The mail attached with the shortcut is transmitted. When the mail address set in the shortcut attached to the received mail and a mail address of the user stored in a PC that receives the mail coincide with each other, access to the document linked to the shortcut is permitted. This enables to more appropriately adjust the access to the document than in the past without changing an access right of the document itself.

7 Claims, 10 Drawing Sheets

| SHORTCUT MANAGEMENT TABLE ||
|---|---|
| SHORTCUT IDENTIFIER | NUMBER OF TIMES OF ACCESS |
| 00000000 | 3 |

| ACCESS-NUMBER-OF-TIMES MANAGEMENT TABLE |||
|---|---|---|
| SHORTCUT IDENTIFIER | USER NAME | NUMBER OF TIMES OF ACCESS |
| 00000000 | A | 1 |

| SHORTCUT MANAGEMENT TABLE | | |
|---|---|---|
| SHORTCUT IDENTIFIER | START DATE | END DATE |
| 00000000 | 2007/11/23 | 2007/11/30 |

DOCUMENT MANAGEMENT SYSTEM, DOCUMENT MANAGEMENT METHOD AND COMPUTER PROGRAM

BACKGROUND OF THE INVENTION

1. Field of the Invention

The present invention relates to a document management system, a document management method and a computer program and in particular is suitably used for adjusting access to a document via a shortcut.

2. Description of the Related Art

Conventionally, a document management system is realized in which an access right is set for a document, which is registered in a database of the document management system, according to a security policy to allow only a user having the access right to view the document.

There is proposed a technique for allowing a user not having the access right to view the document in such a document management system (see Japanese Patent Application Laid-Open No. 2007-188490 and Japanese Patent Application Laid-Open No. 2006-215665).

Specifically, in Japanese Patent Application Laid-Open No. 2007-188490, first, when a user desires to view a document without an access right, the user notifies an administrator of the document without an access right. The administrator creates a use-restricted document in the document management system and stores the document. Consequently, the user can view the document without an access right based on the use-restricted document.

In Japanese Patent Application Laid-Open No. 2006-215665, first, a shortcut of a document stored in the document management system is created and document DB information, user information and use restriction are set in the shortcut. Consequently, it is possible to temporality open only predetermined document data to only a predetermined user conforming to the user information according to the document DB information and the use restriction. Even a user without an access right can view the document.

As described above, the technique disclosed in Japanese Patent Application Laid-Open No. 2007-188490 allows a user without an access right to view a document by relaxing the access right for the document or requesting the administrator or a creator to give the access right to the user.

However, in such a method, there is a risk that the access right of the document itself is changed. Therefore, there is a risk that an access right deviating from a security policy of initial system design is given to the document.

In the technique disclosed in Japanese Patent Application Laid-Open No. 2006-215665, when login (user authentication) is performed based on the user information set in the shortcut, the document can be viewed under a fixed restriction. Therefore, security of the document is not always high. Further, user information exclusive for user authentication has to be set. Therefore, usability is not always high.

SUMMARY OF THE INVENTION

The present invention has been devised in view of such problems and it is an object of the present invention to enable to adjust access to a document more appropriately than in the past without changing an access right of the document itself.

According to one aspect of the present invention, a document management system includes: a shortcut generation unit configured to generate a shortcut of a document; an identifier generation unit configured to generate an identifier for identifying the shortcut generated by the shortcut generation unit; a setting unit configured to set, for the shortcut generated by the shortcut generation unit, the identifier for identifying the shortcut and destination information concerning a destination of the shortcut; a transmitting unit configured to transmit information including the shortcut, for which the identifier and the destination information are set by the setting unit, to an external apparatus; a receiving unit configured to receive information including a shortcut from the external apparatus; an activating unit configured to activate the shortcut received by the receiving unit; a determining unit configured to determine, based on the information set in the shortcut activated by the activating unit, whether access to a document linked to the shortcut should be permitted; and a permitting unit configured to permit, after the access to the document is permitted by the determining unit, the access to the document linked to the shortcut activated by the activating unit.

According to the present invention, the destination information concerning the destination of the shortcut is set in the shortcut. The information including the shortcut is transmitted to the external apparatus. When a shortcut is received from the external apparatus, it is determined based on information set in the shortcut whether access to a document linked to the shortcut should be permitted. Therefore, by using the destination information, it is possible to determine, with a unit different from user authentication, whether the access to the document linked to the shortcut should be permitted. Further, the destination information set when the shortcut is transmitted can be diverted as information for determining whether the access to the document linked to the shortcut should be permitted. Therefore, it is possible to adjust the access to the document more appropriately than in the past without changing an access right of the document itself.

Other objects, configurations and effects of the present invention will be made apparent from the following detailed description and drawings.

Further features of the present invention will become apparent from the following description of exemplary embodiments (with reference to the attached drawings).

DESCRIPTION OF THE EMBODIMENTS

First Embodiment

A first embodiment of the present invention is described below with reference to the accompanying drawings.

Figure 1:
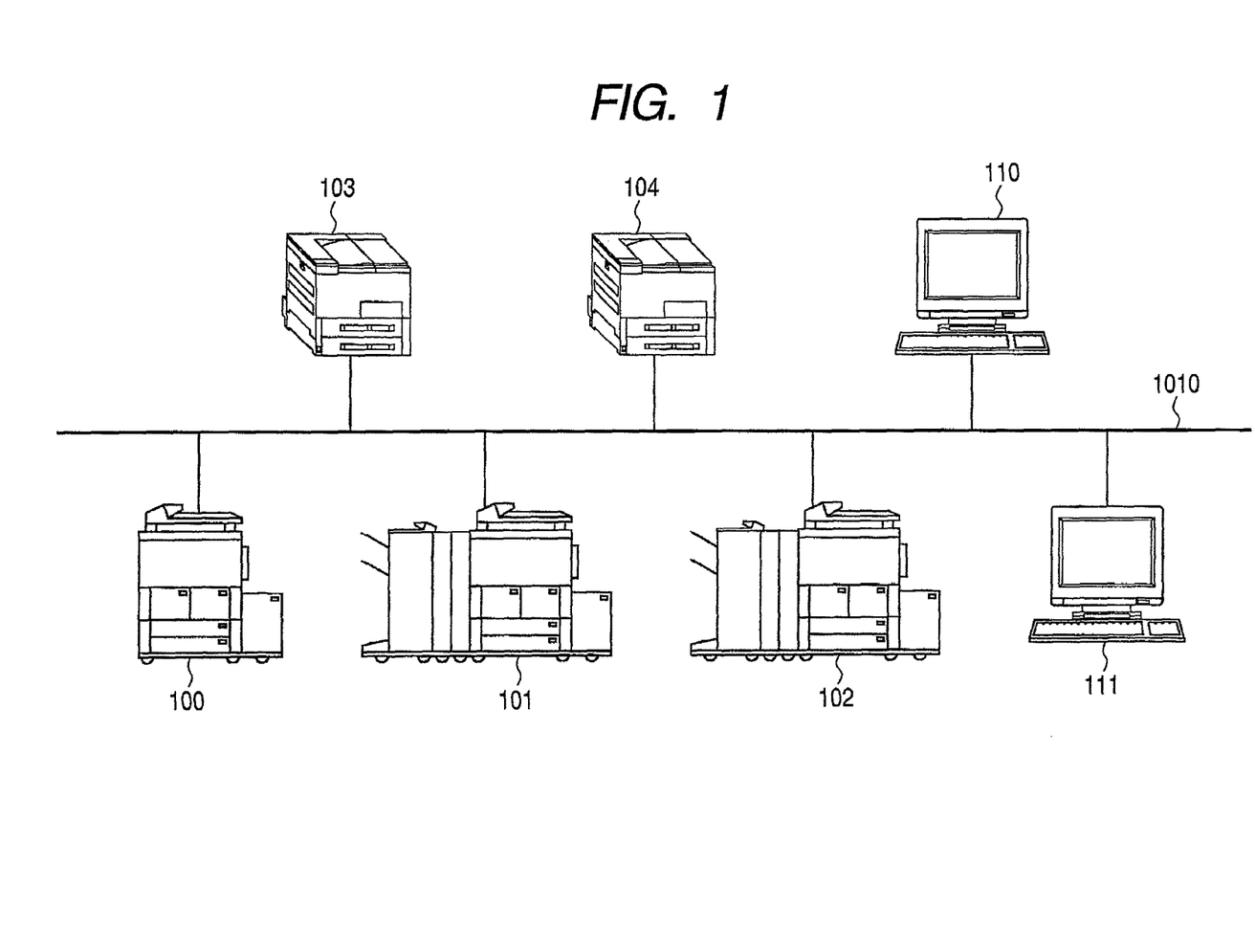
FIG. 1 is a block diagram of an example of an overall configuration of a document management system according to a first embodiment of the present invention.

FIG. 1 is a block diagram of an example of an overall configuration of a document management system.

In FIG. 1, image input and output apparatuses (digital multifunction devices) 100, 101 and 102 have different functions, respectively. For example, functions such as presence or absence of a color function and presence or absence of a finishing configuration are different. Image output apparatuses (printers) 103 and 104 also have different functions, respectively. These apparatuses are connected to a network transmitting unit such as a LAN 1010. Personal computers (in the following description, abbreviated as PCs when necessary) 110 and 111 are connected to the LAN 1010. The PCs 110 and 111 perform storage, editing and reuse of a document such as an office document in cooperation with, for example, the image input and output apparatuses 100 to 102 and the image output apparatuses 103 and 104.

In this embodiment, document management systems are built in the PCs 110 and 111. In this way, in this embodiment, as an example, the document management systems are built in the PCs 110 and 111 and a function of a server and a function of a client are included in the PCs 110 and 111. However, it is also possible to build a "client-server type document management system" separately including a server and a client that uses the server.

Figure 2:
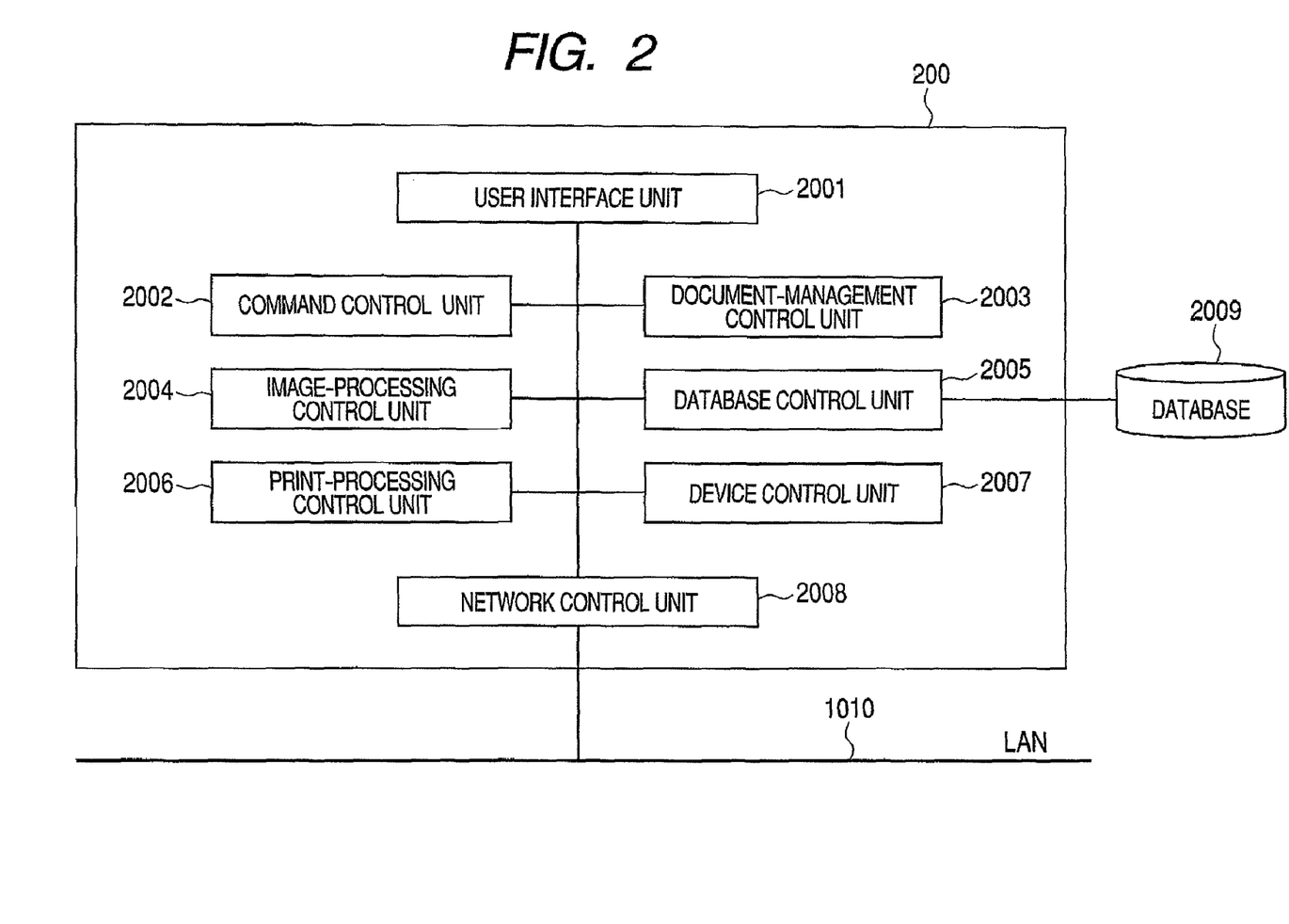
FIG. 2 is a block diagram of an example of a configuration of a document management system, which operates in a PC, according to the first embodiment.

FIG. 2 is a block diagram for describing an example of a configuration of the document management system that operates in the PC 110. Since the PCs 110 and 111 have the same configuration, only the PC 110 is described in detail. Detailed description of the PC 111 is omitted.

In FIG. 2, a user performs an operation such as, via a user interface unit 2001 in a document management system 200, for connection to external apparatuses such as the image input and output apparatuses 100 to 102 and the PC 111, for registration of a document in the database 2009 and for printing of the document. A command control unit 2002 analyzes information concerning operation on the user interface 2001 and performs appropriate processing. In the case of the client-server type document management system, the command control unit 2002 creates a command for performing communication with a server.

An image-processing control unit 2004 applies, according to, for example, application of document images to be input and output, processing such as image format conversion processing for formats such as TIFF and bitmap and compression and expansion processing to document images to be input and output. A document-management control unit 2003 controls all kinds of processing concerning document management.

A database control unit 2005 performs control of processing for creating data to be stored in a database 2009 and storing the data. The database 2009 includes, for example, a volume database, an attribute management database and a full-text search database. The volume database stores document image data itself. The attribute management database stores, for example, a name and a creation date of a document, a comment and printing style information in a print job document. The full-text search database stores, index information of text data extracted from a registered document.

A print-processing control unit 2006 performs control for executing print processing corresponding to a format of a document to be printed. A device control unit 2007 performs input and output of information between the document management system 200 and the image input and output apparatuses 100 to 102 and image output apparatuses 103 and 104. A network control unit 2008 is connected to the LAN 1010 and performs input and output of information between the document management system 200 and the external apparatuses.

Figure 3:
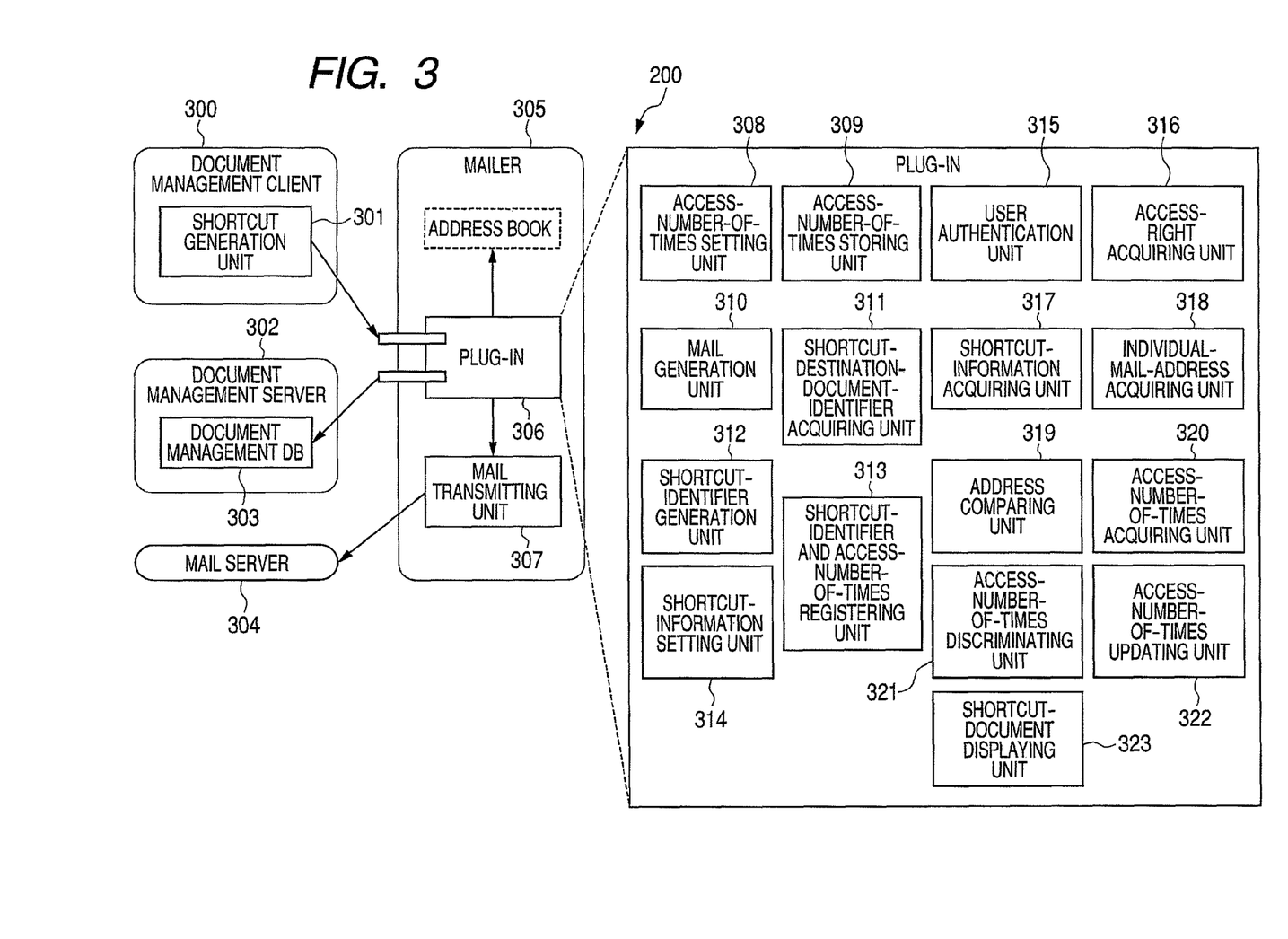
FIG. 3 is a diagram of an example of a configuration of software in the document management system according to the first embodiment.

FIG. 3 is a diagram of an example of a configuration of software in the document management system 200.

The document management system 200 includes a document management client 300, a document management server 302, a mail server 304 and mail software (a mailer) 305.

In FIG. 3, a shortcut generation unit 301 generates a shortcut of a document designated by a user. The shortcut generation unit 301 transmits the generated shortcut to a plug-in 306.

A document management DB 303 stores document data and the like. The document management DB 303 stores restriction information (information concerning restriction on access to a document) transmitted from the plug-in 306 in a predetermined table.

The plug-in 306 includes an access-number-of-times setting unit 308, an access-number-of-times storing unit 309, a mail generation unit 310, a shortcut-destination-document-identifier acquiring unit 311, a shortcut-identifier generation unit 312 and a shortcut-identifier and access-number-of-times registering unit 313. The plug-in 306 further includes a shortcut-information setting unit 314, a user authentication unit 315, an access-right acquiring unit 316, a shortcut-information acquiring unit 317, an individual-mail-address acquiring unit 318, an address comparing unit 319 and an access-number-of-times acquiring unit 320. Besides, the plug-in 306 includes an access-number-of-times discriminating unit 321, an access-number-of-times updating unit 322 and a shortcut-document displaying unit 323.

When the plug-in 306 receives the shortcut generated by the shortcut generation unit 301, the plug-in 306 activates the access-number-of-times setting unit 308. When the access-number-of-times setting unit 308 receives the shortcut generated by the shortcut generation unit 301, the access-number-of-times setting unit 308 displays an access-number-of-times setting screen on a display and urges the user to input the number of times of access to the document. The access-number-of-times storing unit 309 stores the input number of times of access.

The mail generation unit 310 generates, based on operation of the user, a mail attached with the shortcut generated by the shortcut generation unit 301. The shortcut-identifier generation unit 312 generates a shortcut identifier peculiar to the shortcut. The peculiar shortcut identifier is generated by using, for example, an identifier acquired by the shortcut-destination-document-identifier acquiring unit 311, time (present time, etc.) and peculiar information (a network identifier, etc.) of the PC in which the document management system 200 is present.

The shortcut-identifier and access-number-of-times registering unit 313 registers the number of times of access stored by the access-number-of-times storing unit 309 and the shortcut identifier generated by the shortcut-identifier generation unit 312 in a shortcut management table in the document management DB 303.

Figure 4:
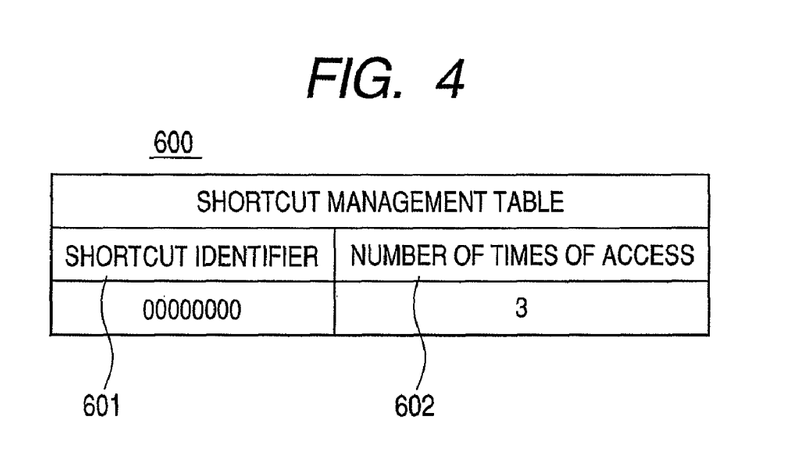
FIG. 4 is a diagram of an example of a shortcut management table for managing the number of times of access in which a document can be displayed from a shortcut in the first embodiment.

FIG. 4 is a diagram of an example of the shortcut management table for managing the number of times of access in which a document can be displayed from a shortcut.

In FIG. 4, the shortcut management table 600 includes two fields, a shortcut identifier 601 and a number of times of access 602.

The shortcut identifier 601 is a field that stores a shortcut identifier for uniquely identifying a shortcut. The number of times of access 602 is a field that stores the number of times of access in which a document can be displayed from the shortcut.

Referring back to FIG. 3, the shortcut-information setting unit 314 sets the shortcut identifier generated by the shortcut-identifier generation unit 312 and a mail address set in a destination of a mail in the shortcut generated by the shortcut generation unit 301.

The user authentication unit 315 performs user authentication when a shortcut attached to a received mail is activated based on an instruction of the user. For example, the user authentication unit 315 performs user authentication using user information (a user name, etc.) input by the user and user information set in the document management server 302 in advance and determines permissibility of login by the user.

The access-right acquiring unit 316 acquires an access right of a document linked to the activated shortcut from the document management server 302 (e.g., the document management DB 303). For example, a table in which users, document names and access rights are associated with one another is registered in the document management server 302 (e.g., the document management DB 303). In this embodiment, the access right of the document is managed by using this table.

The short-cut-information acquiring unit 317 acquires, from the shortcut activated based on the instruction of the user, a shortcut identifier and a mail address set for the shortcut by the shortcut-information setting unit 314.

The individual-mail-address acquiring unit 318 acquires a mail address of an individual stored by the mailer 305.

The address comparing unit 319 compares the mail address acquired by the shortcut-information acquiring unit 317 and the mail address acquired by the individual-mail-address acquiring unit 318 and determines whether the mail addresses coincide with each other.

Figure 5:
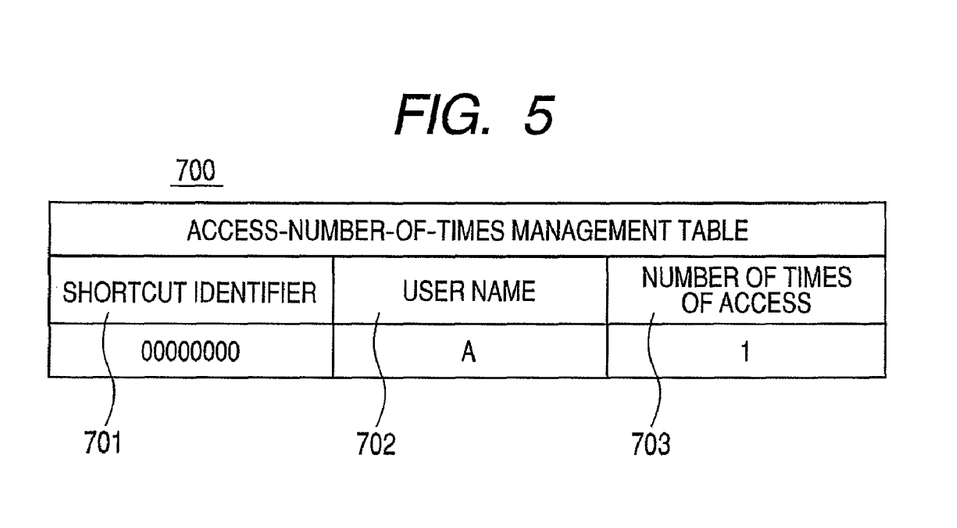
FIG. 5 is a diagram of an example of an access number of times management table for managing the number of times a user displays the document from the shortcut in the first embodiment.

The access-number-of-times acquiring unit 320 acquires, with the shortcut identifier acquired by the shortcut-information acquiring unit 317 set as a key, a value of the number of times of access 602 of the shortcut stored by the shortcut management table 600. Further, the access-number-of-times acquiring unit 320 acquires, with the shortcut identifier acquired by the shortcut-information acquiring unit 317 and the user name used in the user authentication set as keys, a value of the number of times of access 703 stored by an access-number-of-times management table 700.

FIG. 5 is a diagram of an example of the access-number-of-times management table 700 for managing the number of times the user displays a document from a shortcut.

The access-number-of-times management table 700 shown in FIG. 5 is stored in the document management DB 303. The access-number-of-times management table 700 includes three fields, a shortcut identifier 701, a user name 702 and the number of times of access 703.

The shortcut identifier 701 is a field that stores a shortcut identifier for uniquely identifying a shortcut. The user name 702 is a field that stores a name of a user who instructs display of a document from the shortcut. The number of times of access 703 is a field that stores the number of times (the number of times of access) the user instructs display of the document from the shortcut.

Referring back to FIG. 3, the access-number-of-times discriminating unit 321 compares the numbers of times of access acquired by the access-number-of-times acquiring unit 320 (the number of times of access 602 of the shortcut and the number of times of access 703 of the user). The access-number-of-times discriminating unit 321 discriminates, based on a result of the comparison, whether the number of times of access 703 of the user does not exceed the number of times of access 602 of the shortcut.

When the number of times of access 703 of the user does not exceed the number of times of access 602 of the shortcut, the access-number-of-times updating unit 322 updates the number of times of access 703 of the access-number-of-times table 700.

The shortcut-document displaying unit 323 acquires the document linked to the shortcut from the document management server 302 and displays the document on the display.

Figure 6:
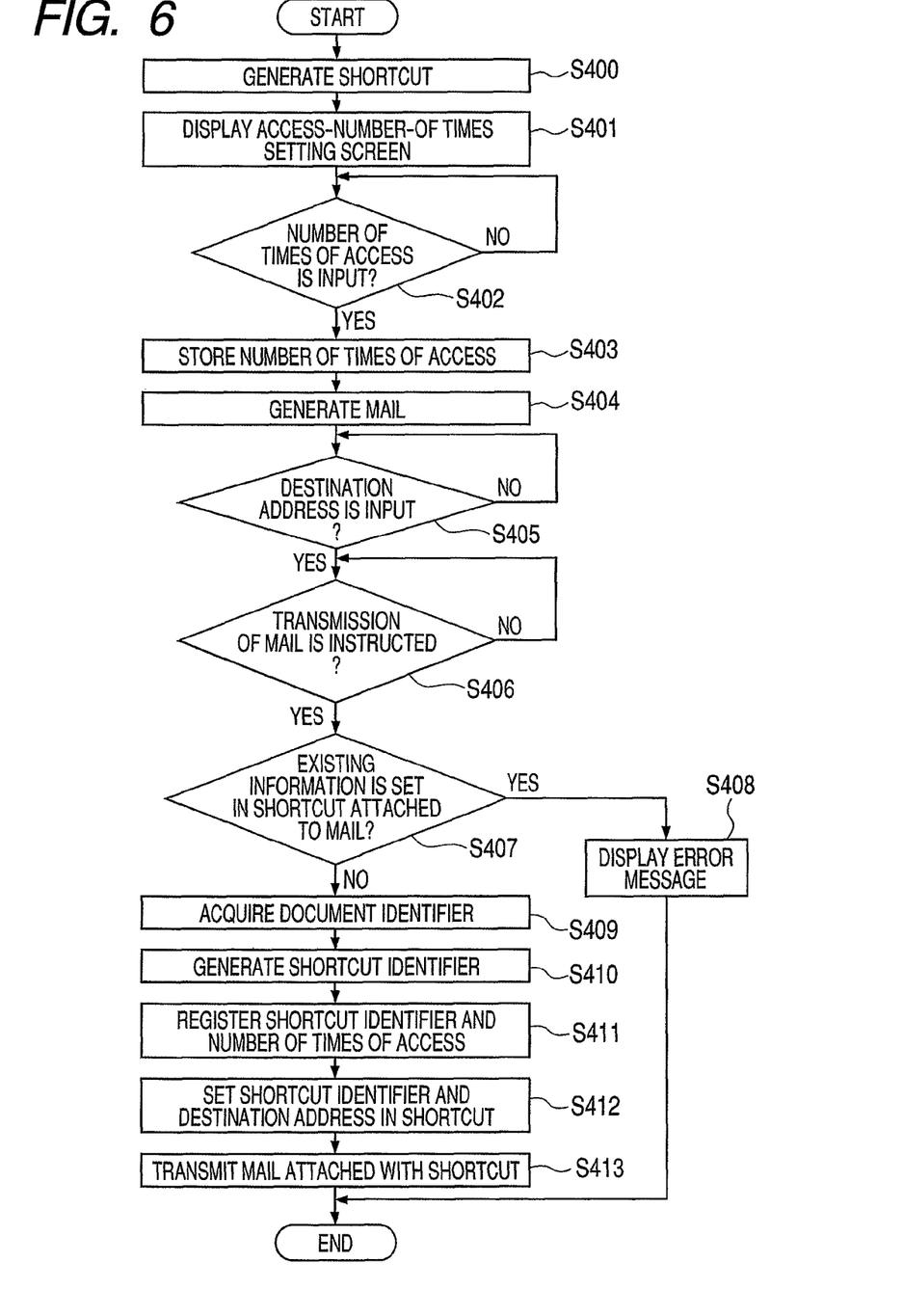
FIG. 6 is a flowchart for describing an example of processing of the PC in creating a shortcut and transmitting a mail in the first embodiment.

FIG. 6 is a flowchart for describing an example of processing of the PC 110 in creating a shortcut and transmitting a mail.

First, in step S400, the shortcut generation unit 301 generates a shortcut of an arbitrary document selected by the user.

As described above, in this embodiment, for example, an example of a shortcut generation unit is realized by performing processing in step S400.

Subsequently, in step S401, the access-number-of-times setting unit 308 displays, on the display, an access-number-of-times setting screen for setting the number of times of access to the shortcut generated in step S400.

In step S402, the access-number-of-times setting unit 308 stays on standby until the user inputs the number of times of access on the access-number-of-times setting screen. As a method of inputting the number of times of access, it is possible to adopt various methods such as a method of directly inputting the number of times of access as a number and a method of selecting the number of times of access from a selection-type list. When the number of times of access is input, the processing proceeds to step S403.

When the processing proceeds to step S403, the access-number-of-times setting unit 308 stores a value of the number of times of access determined as being input in step S402.

Subsequently, in step S404, the mail generation unit 310 generates a mail attached with the shortcut generated in step S400.

In step S405, the mail generation unit 310 stays on standby until a destination (a destination address) of the mail generated in step S404 is input by the user. One address or plural addresses may be input. When a destination of the mail generated in the step S404 is input, the processing proceeds to step S406.

When the processing proceeds to step S406, the mail generation unit 310 stays on standby until execution of transmission of the mail is instructed by the user. When execution of transmission of the mail is instructed, the processing proceeds to step S407.

When the processing proceeds to step S407, the mail generation unit 310 determines whether existing information (a shortcut identifier and a destination address) is already set in the shortcut attached to the mail. As a result of the determination, when existing information is set in the shortcut attached to the mail, the processing proceeds to step S408.

When the processing proceeds to step S408, since the shortcut identifier and the mail address are already set in the shortcut, the mail generation unit 310 displays, on the display, a message for informing the user that a mail cannot be transmitted. The processing according to the flowchart shown in FIG. 6 finishes.

On the other hand, when existing information is not set in the shortcut attached to the mail, the processing proceeds to step S409. When the processing proceeds to step S409, the shortcut-destination-document-identifier acquiring unit 311 acquires an identifier of a document (a document identifier) linked to the shortcut generated in step S400.

In step S410, the shortcut-identifier generation unit 312 generates a shortcut identifier using the document identifier acquired in step S409, time (hour, minute and second) and the peculiar information of the PC 110.

As described above, in this embodiment, for example, an example of an identifier generation unit is realized by performing the processing in step S410.

In step S411, the shortcut-identifier and access-number-of-times registering unit 313 registers the shortcut identifier generated in step S410 and the number of times of access stored by the access-number-of-times storing unit 309 in the shortcut management table 600.

As described above, in this embodiment, for example, an example of use restriction information is realized by the number of times of access. An example of a storing unit is realized by performing the processing in step S411.

In step S412, the shortcut-information setting unit 314 sets the shortcut identifier generated in step S410 and the destination address determined as being input in step S407 in the shortcut generated in step S400.

As described above, in this embodiment, for example, an example of destination information is realized by the destination address. An example of a setting unit is realized by performing the processing in step S412.

In step S413, the mail generation unit 310 transmits a mail attached with the shortcut, in which the shortcut identifier and the destination address are set in step S412, to the destination (e.g., the PC 111) determined as being input in step S405. The PC 110 finishes the processing according to the flowchart shown in FIG. 6.

As described above, in this embodiment, for example, an example of a transmitting unit is realized by performing the processing in step S413.

Figure 7:
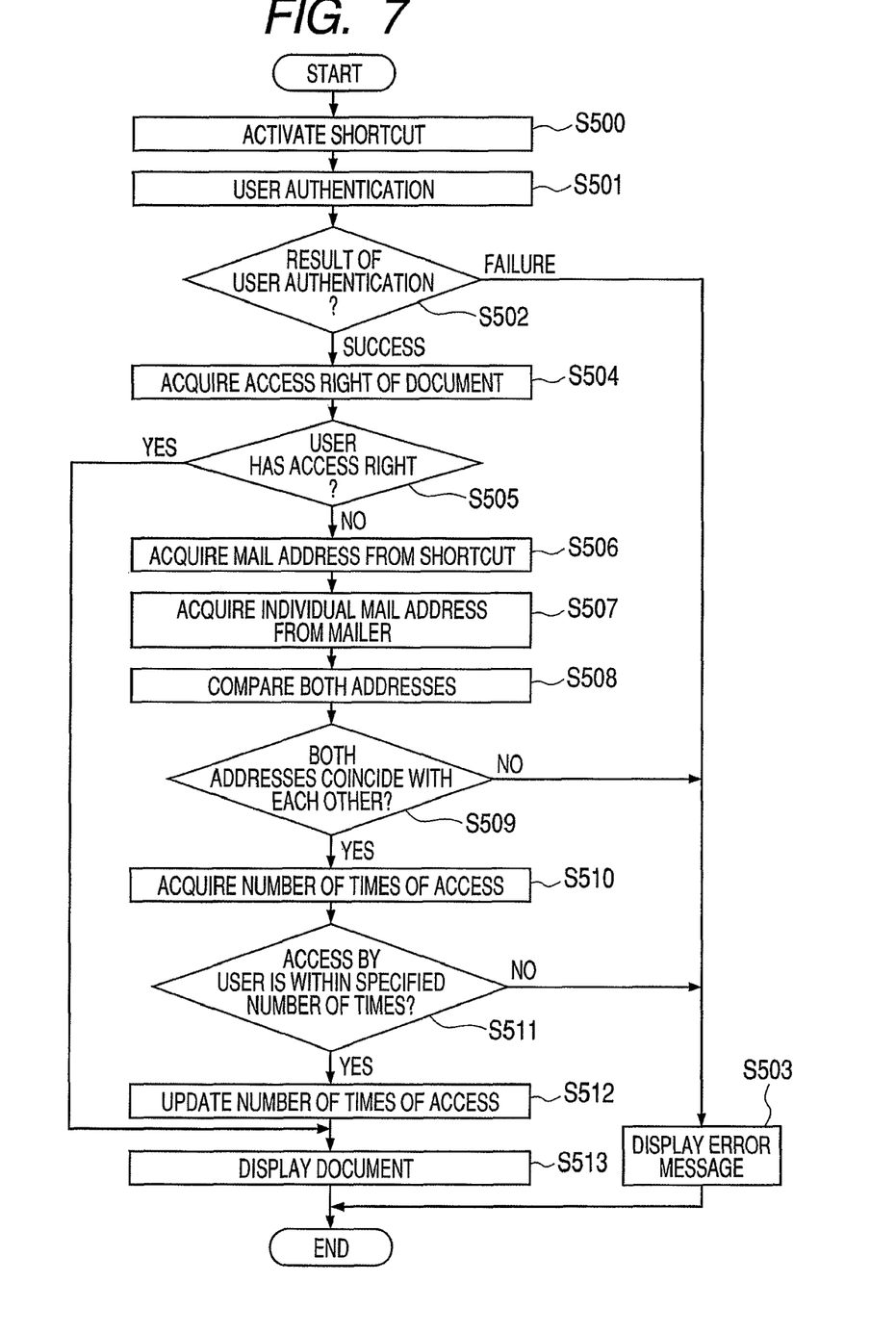
FIG. 7 is a flowchart for describing an example of processing of the PC in displaying a document from a shortcut attached to a received mail in the first embodiment.

FIG. 7 is a flowchart for describing an example of processing of the PC 110 in displaying a document from a shortcut attached to a received mail.

First, in step S500, the shortcut-information acquiring unit 317 activates, based on an instruction of the user, a shortcut attached to a mail received by the mailer 305.

As described above, in this embodiment, for example, examples of a receiving unit and an activating unit are realized by performing the processing in step S500.

In step S501, the user authentication unit 315 inputs user information (a user name, a password, etc.) and performs user authentication in order to make connection to the document management server 302.

As described above, in this embodiment, for example, an example of an authentication unit is realized by performing processing in step S501.

In step S502, the user authentication unit 315 determines, based on a result of the authentication in step S501, whether the user authentication unit 315 succeeds or fails in the user authentication. As a result of the determination, when the user authentication unit 315 fails in the user authentication, the processing proceeds to step S503. In step S503, the shortcut-document displaying unit 323 displays, on the display, a message for informing the user that the processing finishes because the processing failed (an error message). The PC 110 finishes the processing according to the flowchart of FIG. 7.

On the other hand, when the user authentication unit 315 succeeds in the user authentication, the processing proceeds to step S504. In step S504, the access-right acquiring unit 316 acquires an access right of a document linked to the shortcut activated in step S500 from the document management server 302.

In step S505, the access-right acquiring unit 316 determines whether the user has the access right of the document linked to the shortcut activated in step S500. As a result of the determination, when the user has the access right of the document, the processing proceeds to step S513 described later. On the other hand, when the user does not have the access right of the document, the processing proceeds to step S506.

As described above, in this embodiment, for example, an example of a third determining unit is realized by performing the processing in step S505.

When the processing proceeds to step S506, the shortcut-information acquiring unit 317 acquires, from the shortcut activated in step S500, a mail address set in the shortcut.

In step S507, the individual-mail-address acquiring unit 318 acquires a mail address of an individual (an individual mail address) set in the mailer 305 from the mailer 305.

In step S508, the address comparing unit 319 compares "the mail address set in the shortcut" acquired in step S506 and "the individual mail address set in the mailer 305" acquired in step S507.

In step S509, the address comparing unit 319 determines, based on a result of the comparison in step S508, whether the individual mail address coincides with mail addresses set in the shortcut.

As described above, in this embodiment, for example, an example of location information indicating the location of the individual is realized by the individual mail address. An example of a first determining unit is realized by performing the processing in step S509.

As a result of the determination, when the individual mail address coincides with none of the mail addresses set in the shortcut, the processing proceeds to step S503 and the error message is displayed. The PC 110 finishes the processing according to the flowchart of FIG. 7.

On the other hand, when the individual mail address coincides with a mail address set in the shortcut, the processing proceeds to step S510. When the processing proceeds to step S510, the access-number-of-times acquiring unit 320 acquires, with the shortcut identifier set in the shortcut activated in step S500 set as a key, the number of times of access 602 registered in the shortcut management table 600. Further, the access-number-of-times acquiring unit 320 acquires, with the shortcut identifier set in the shortcut and the user information input in the user authentication in step S501 set as keys, the number of times of access 703 registered in the access-number-of-times management table 700.

As described above, in this embodiment, for example, an example of an acquiring unit is realized by performing the processing in step S510.

In step S511, the access-number-of-times discriminating unit 321 determines whether access by the user to the shortcut activated in step S500 is within a specified number of times. Specifically, the access-number-of-times discriminating unit 321 determines whether a value of the number of times of access 703 registered in the access-number-of-times management table 700 does not exceed a value of the number of times of access 602 registered in the shortcut management table 600.

As described above, in this embodiment, for example, an example of a second determining unit is realized by performing the processing in step S511.

As a result of the determination, when the value of the number of times of access 703 registered in the access-number-of-times management table 700 exceeds the value of the number of times of access 602 registered in the shortcut management table 600, the processing proceeds to step S503. In step S503, the error message is displayed. The PC 110 finishes the processing according to the flowchart of FIG. 7.

On the other hand, when the value of the number of times of access 703 registered in the access-number-of-times management table 700 does not exceed the value of the number of times of access 602 registered in the shortcut management table 600, the processing proceeds to step S512. When the processing proceeds to step S512, the access-number-of-times updating unit 322 increases by one the number of times of access 703 corresponding to the shortcut identifier set in the shortcut activated in step S700 and the user information input in the user authentication in step S501.

In step S513, the shortcut-document displaying unit 323 acquires the data of the document linked to the shortcut activated in step S500 from the document management server 302 and displays the data on the display. The PC 110 finishes the processing according to the flowchart of FIG. 7.

As described above, in this embodiment, for example, an example of a permitting unit is realized by performing the processing in step S513.

As described above, in this embodiment, when a shortcut of a document is generated, the user is caused to set the number of times of access to the shortcut and a shortcut identifier for specifying the shortcut is generated. The shortcut identifier and the number of times of access are associated with each other and registered in the shortcut management table 600. Thereafter, the generated shortcut identifier and a mail address as a destination of a mail are set in a shortcut and a mail attached with the shortcut is transmitted.

When the mail is received, the shortcut attached to the mail is activated based on operation of the user. Thereafter, when user authentication is successful, it is determined whether the user has an access right to a document linked to the shortcut. As a result of the determination, when the user does not have the access right, it is further determined whether the mail address set in the shortcut and a mail address of a PC that receives the mail coincide with each other. When the mail addresses coincide with each other and the number of times of access of the user to the activated shortcut is within a specified number of times, access to the document linked to the shortcut is permitted.

Therefore, it is possible to cause the user to view a document without an access right without changing the access right of the document or requesting an administrator to give the access right to the document. It is possible to maintain use restriction in the shortcut by storing the use restriction in the document management DB 303.

When the shortcut is transmitted by a mail, a mail address of a destination is stored in the shortcut by the mailer 305 (the plug-in). The mail address is used for identification rather than user authentication. Therefore, when the document is opened from the shortcut, after the user authentication is performed, the mail address of the PC set in the mailer 305 and the mail address set in the shortcut are compared. When the mail addresses coincide with each other, it is possible to allow the user to view the document without the access right. In this way, it is possible to display the document without the access right under a fixed restriction while improving security of the document by performing identification after user authentication.

Further, a destination address set when the shortcut is delivered by mail is automatically set in the shortcut. Therefore, it is possible to perform, in a series of operation, processing for selecting a user desiring access to a document and processing for delivering the shortcut. Therefore, it is possible to improve usability.

Second Embodiment

A second embodiment of the present invention is described. In the example described in the first embodiment, the number of times of display of a document is restricted by the number of times of access to the document via a shortcut. However, the number of times of display of a document can be restricted by other methods. Therefore, in an example described in this embodiment, the display of a document is restricted by a date range. In this way, this embodiment and the first embodiment are mainly different in a part of a method of restricting the number of times of display of a document. Therefore, in the description of this embodiment, components same as those in the first embodiment are denoted by the same reference numerals and signs shown in FIGS. 1 to 7 and description of the components are omitted.

Figure 8:
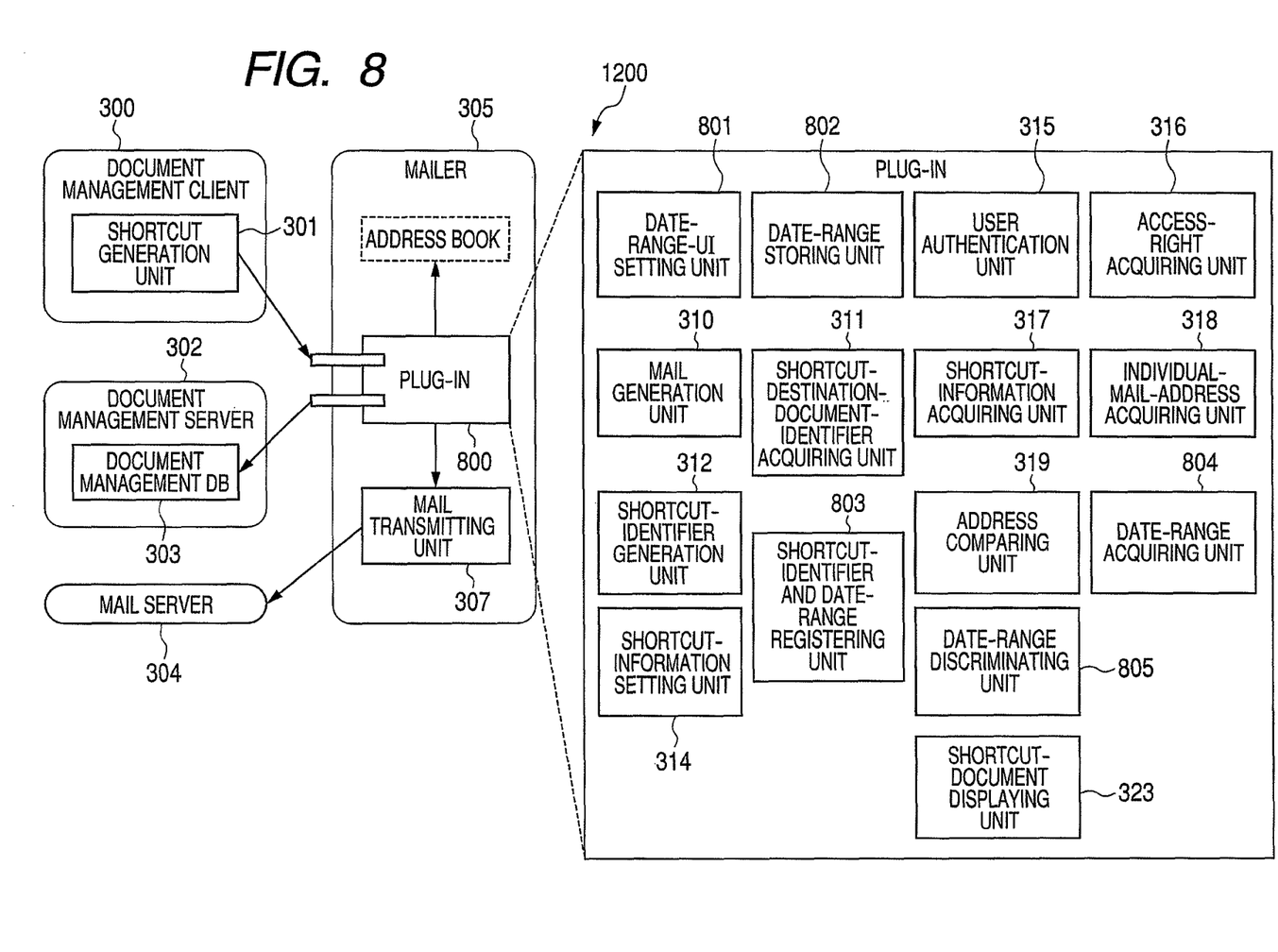
FIG. 8 is a diagram of an example of a configuration of software in a document management system according to a second embodiment of the present invention.

FIG. 8 is a diagram of an example of a configuration of software in a document management system 1200. A basic configuration of the document management system 1200 according to this embodiment is the same as that of the document management system 200 according to the first embodiment shown in FIG. 3. However, a part of functions of a plug-in 800 is different from that of the plug-in 306 in the first embodiment. Differences from the document management system 200 according to the first embodiment are described below.

In FIG. 8, the plug-in 800 includes a date-range-UI setting unit 801 instead of the access-number-of-times setting unit 308 and includes a date-range storing unit 802 instead of the access-number-of-times storing unit 309. Further, the plug-in 800 includes a shortcut-identifier and date-range registering unit 803 instead of the shortcut-identifier and access-number-of-times registering unit 313 and includes a date-range acquiring unit 804 instead of the access-number-of-times acquiring unit 320. Besides, the plug-in 800 includes a date-range discriminating unit 805 instead of the access-number-of-times discriminating unit 321. The plug-in 800 does not have the function of the access-number-of-times updating unit 322. In the document management system 1200 according to this embodiment, the access-number-of-times management table 700 shown in FIG. 5 is unnecessary.

When the date-range-UI setting unit 801 receives the shortcut generated by the shortcut generation unit 301, the date-range-UI setting unit 801 displays a date-range setting screen on the display and urges the user to input a date range. The date-range storing unit 802 stores the input date range.

The shortcut-identifier and date-range registering unit 803 registers the date range stored by the date-range storing unit 802 and the shortcut identifier generated by the shortcut-identifier generation unit 312 in a shortcut management table in the document management DB 303.

Figure 9:
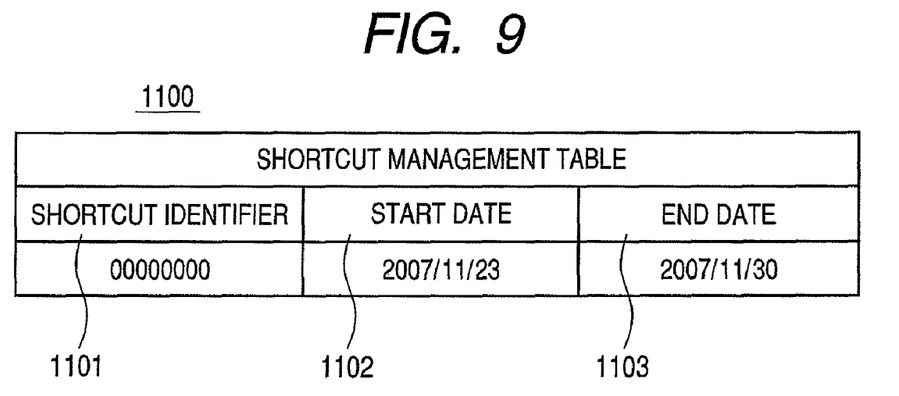
FIG. 9 is a diagram of an example of a shortcut management table for managing a range of dates when a document can be displayed from a shortcut in the second embodiment.

FIG. 9 is a diagram of an example of the shortcut management table for managing a date range in which a document can be displayed from a shortcut.

In FIG. 9, a shortcut management table 1100 includes three fields: a shortcut identifier 1101, a start date 1102 and an end date 1103.

The shortcut identifier 1101 is a field for storing a shortcut identifier for uniquely identifying a shortcut. The start date 1102 is a field for storing a start date (date and time) of a date range in which a document can be displayed from a shortcut. The end date 1103 is a field for storing an end date (date and time) of the date range in which a document can be displayed from a shortcut.

Referring back to FIG. 8, the date-range acquiring unit 804 acquires, with the shortcut identifier acquired by the shortcut-information acquiring unit 317 set as a key, the start date 1102 and the end date 1103 of the shortcut stored in the shortcut management table 1100.

The date-range discriminating unit 805 discriminates whether a date when the user intends to display a document (the present date, a date when the shortcut is activated, etc.) is included in a date range based on "the start date 1102 and the end date 1103" acquired by the date-range acquiring unit 804.

Figure 10:
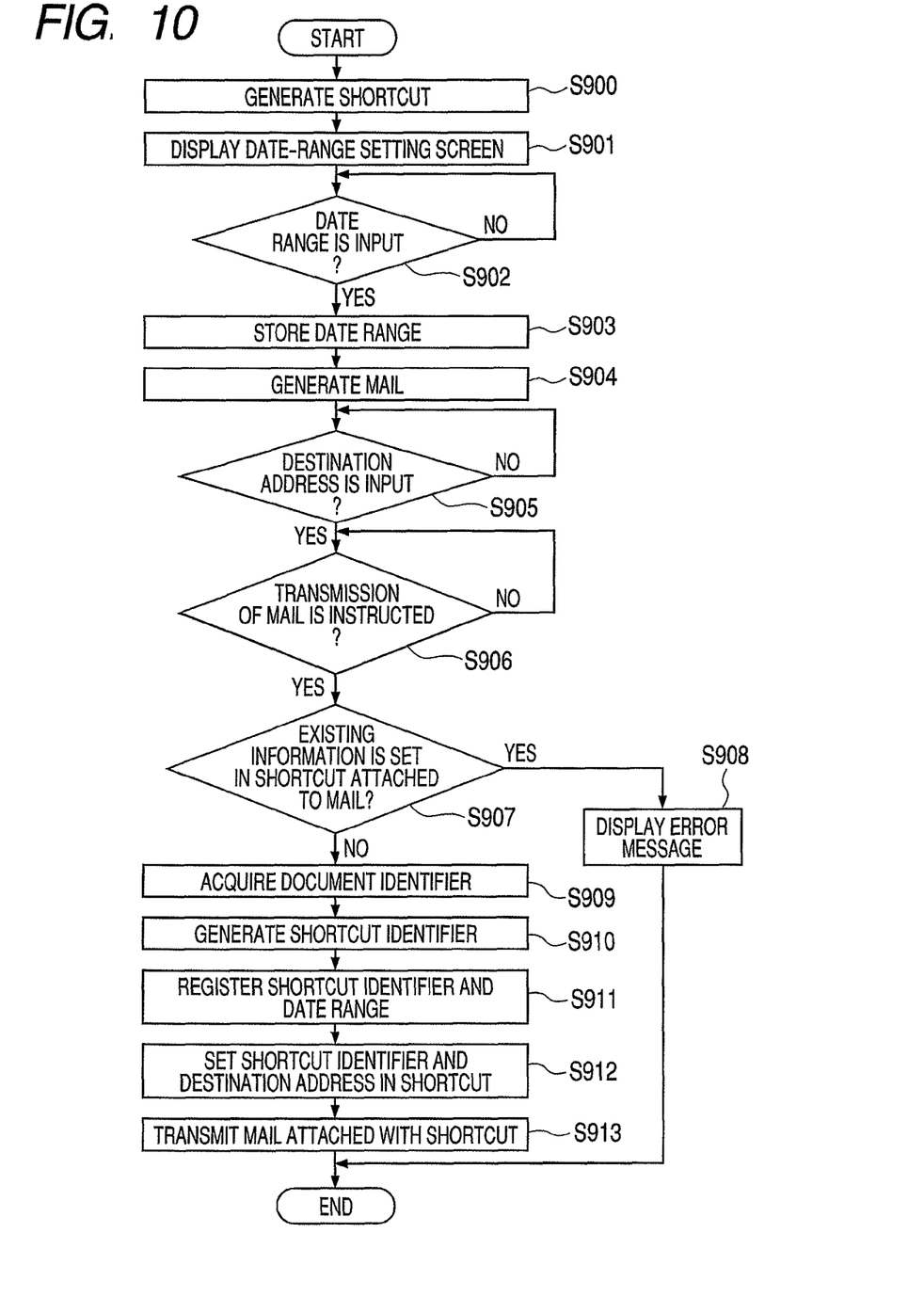
FIG. 10 is a flowchart for describing an example of processing of a PC in creating a shortcut and transmitting a mail in the second embodiment.

FIG. 10 is a flowchart for describing an example of processing of the PC 110 in creating a shortcut and transmitting the shortcut by mail.

First, in step S900, the shortcut generation unit 301 generates a shortcut of an arbitrary document selected by the user.

As described above, in this embodiment, for example, an example of a shortcut generation unit is realized by performing the processing in step S900.

Subsequently, in step S901, the date-range-UI setting unit 801 displays, on the display, a date-range setting screen for setting a date range for the shortcut generated in step S901.

In step S902, the date-range-UI setting unit 801 stays on standby until the user inputs a date range on the date-range setting screen. As a method of inputting a date range, it is possible to adopt various methods such as a method of directly inputting a date range as dates and a method of selecting a date range from a screen such as a calendar. When a date range is input, the processing proceeds to step S903.

When the processing proceeds to step S903, the date-range storing unit 802 stores a value of the date range determined as being input in step S902.

In step S904, the mail generation unit 310 generates a mail attached with the shortcut generated in step S900.

In step S905, the mail generation unit 310 stays on standby until a destination (a destination address) of the mail generated in step S904 is input by the user. One destination or plural destinations may be input. When a destination of the mail generated in step S904 is input, the processing proceeds to step S906.

When the processing proceeds to step S906, the mail generation unit 310 stays on standby until execution of transmission of the mail is instructed by the user. When the execution of transmission of the mail is instructed, the processing proceeds to step S907.

When the processing proceeds to step S907, the mail generation unit 310 determines whether existing information (a shortcut identifier and a destination address) is already set in the shortcut attached to the mail. As a result of the determination, when existing information is set in the shortcut attached to the mail, the processing proceeds to step S908.

When the processing proceeds to step S908, since the shortcut identifier and the mail address are already set in the shortcut, the mail generation unit 310 displays, on the display, a message for informing the user that the mail cannot be transmitted. The PC 110 finishes the processing according to the flowchart of FIG. 10.

On the other hand, when existing information is not set in the shortcut attached to the mail, the processing proceeds to step S909. When the processing proceeds to step S909, the shortcut-destination-document-identifier acquiring unit 311 acquires an identifier of a document (a document identifier) linked to the shortcut generated in step S900 from the document management server 302.

In step S910, the shortcut-identifier generation unit 312 generates a shortcut identifier using the document identifier acquired in step S909, time (hour, minute and second) and the peculiar information of the PC 110.

As described above, in this embodiment, for example, an example of an identifier generation unit is realized by performing the processing in step S910.

In step S911, the shortcut-identifier and date-range registering unit 803 registers the shortcut identifier generated in step S910 and the date range stored by the date-range storing unit 802 in the shortcut management table 1100.

As described above, in this embodiment, for example, an example of use restriction information (a use period) is realized by the date range. An example of a storing unit is realized by performing the processing in step S911.

In step S912, the shortcut-information setting unit 314 sets the shortcut identifier generated in step S910 and the destination address determined as being input in step S907 in the shortcut generated in step S900.

As described above, in this embodiment, for example, an example of destination information is realized by the destination address. An example of a setting unit is realized by performing the processing in step S912.

In step S913, the mail generation unit 310 transmits a mail attached with the shortcut in which the shortcut identifier and the destination address are set in step S912 to the destination (e.g., the PC 111) determined as being input in step S905. The PC 110 finishes the processing according to the flowchart of FIG. 10.

As described above, in this embodiment, an example of a transmitting unit is realized by performing the processing in step S913.

Figure 11:
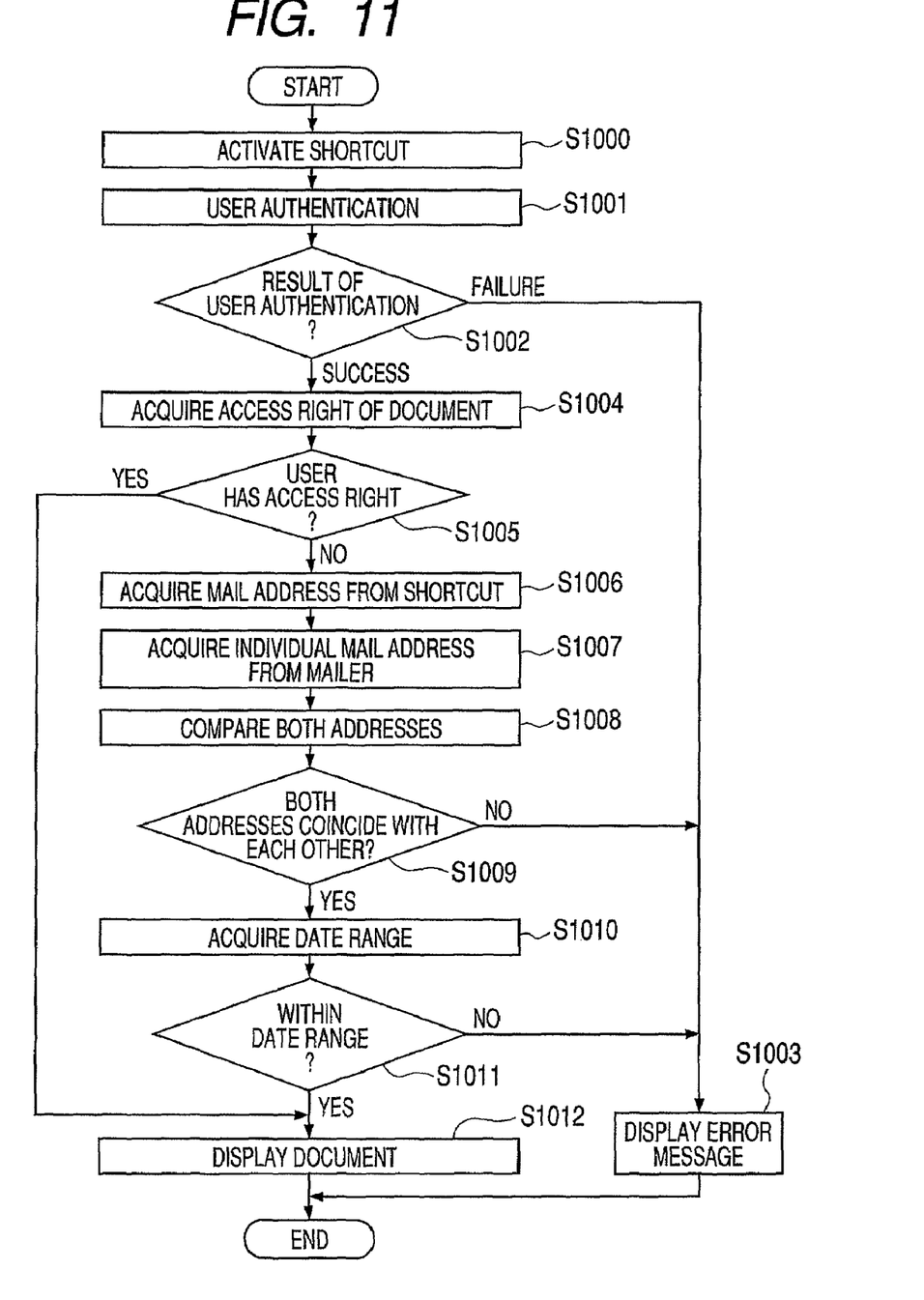
FIG. 11 is a flowchart for describing an example of processing of the PC in displaying a document from a shortcut attached to a received mail in the second embodiment.

FIG. 11 is a flowchart for describing an example of processing of the PC 110 in displaying a document from a shortcut attached to a received mail.

First, in step S1000, the shortcut-information acquiring unit 317 activates a shortcut attached to a mail received by the mailer 305 based on an instruction of the user.

As described above, in this embodiment, for example, examples of a receiving unit and an activating unit are realized by performing the processing in step S1000.

Subsequently, in step S1001, the user authentication unit 315 inputs user information (a user name, a password, etc.) and performs user authentication in order to make connection to the document management server 302.

As described above, in this embodiment, for example, an example of an authentication unit is realized by performing the processing in step S1001.

In step S1002, the user authentication unit 315 determines, based on a result of the authentication in step S1001, whether the user authentication unit 315 succeeds or fails in the user authentication. When the user authentication unit 315 fails in the user authentication, the processing proceeds to step S1003. In step S1003, the shortcut-document displaying unit 323 displays, on the display, a message for informing the user that the processing finishes because the processing failed (an error message). The PC 110 finishes the processing according to the flowchart of FIG. 11.

On the other hand, when the user authentication unit 315 succeeds in the user authentication, the processing proceeds to step S1004. In step S1004, the access-right acquiring unit 316 acquires an access right of a document linked to the shortcut activated in step S1000 from the document management server 302.

In step S1005, the access-right acquiring unit 316 determines whether the user has the access right to the document linked to the shortcut activated in step S1000. As a result of the determination, when the user has the access right to the document, the processing proceeds to step S1012 described later. On the other hand, when the user does not have the access right to the document, the processing proceeds to step S1006.

As described above, in this embodiment, for example, an example of a third determining unit is realized by performing the processing in step S1005.

When the processing proceeds to step S1006, the shortcut-information acquiring unit 317 acquires a mail address set in the shortcut from the shortcut activated in step S1000.

In step S1007, the individual-mail-address acquiring unit 318 acquires a mail address of an individual (an individual mail address) set in the mailer 305 from the mailer 305.

In step S1008, the address comparing unit 319 compares "the mail address set in the shortcut" acquired in step S1006 and "the individual mail address set in the mailer 305" acquired in step S1007.

In step S1009, the address comparing unit 319 determines, based on a result of the comparison in step S1008, whether the individual mail address coincides with mail addresses set in the shortcut.

As described above, in this embodiment, for example, an example of location information indicating a location of the individual is realized by the individual mail address, and an example of a first determining unit is realized by performing the processing in step S1009.

As a result of the determination, when the individual mail address coincides with none of the mail addresses set in the shortcut, the processing proceeds to step S1003 and an error message is displayed. The PC 110 finishes the processing according to the flowchart of FIG. 11.

On the other hand, when the individual mail address coincides with a mail address set in the shortcut, the processing proceeds to step S1010. When the processing proceeds to step S1010, the date-range acquiring unit 804 performs the next processing. The date-range acquiring unit 804 acquires, with the shortcut identifier set in the shortcut activated in step S1000 set as a key, the date range (the start date 1102 and the end date 1103) registered in the shortcut management table 1100.

As described above, in this embodiment, for example, an example of an acquiring unit is realized by performing the processing in step S1010.

In step S1011, the date-range discriminating unit 805 determines whether a date when the user intends to display the document is included in the date range (in the range from the start date 1102 to the end date 1103) acquired in step S1010.

As described above, in this embodiment, for example, an example of a second determining unit is realized by performing the processing in step S1011.

As a result of the determination, when the date when the user intends to display the document is not included in the date range acquired in step S1010, the processing proceeds to step S1003. In step S1003, an error message is displayed. The PC 110 finishes the processing according to the flowchart of FIG. 11.

On the other hand, when the date when the user intends to displays the document is included in the date range acquired in step S1010, the processing proceeds to step S1012. When the processing proceeds to step S1012, the shortcut-document displaying unit 323 acquires data of the document linked to the shortcut activated in step S1000 from the document management server 302 and displays the data on the display. The PC 110 finishes the processing according to the flowchart of FIG. 11.

As described above, in this embodiment, for example, an example of a permitting unit is realized by performing the processing in step S1012.

As described above, when the display of the document is restricted by the date range, it is also possible to obtain the same effect as the first embodiment described above.

The display of the document may be restricted by using both the number of times of access and the date range. In this embodiment, the various modifications described in the first embodiment can be adopted.

Other Embodiments of the Present Invention

The units configuring the document management system and the steps of the document management method according to the embodiments of the present invention can be realized by the operation of a computer program stored in a RAM, a ROM or the like of a computer. The computer program and a computer-readable recording medium having the computer program recorded therein are included in the present invention.

An embodiment as, for example, a system, an apparatus, a method, a computer program or a storage medium is also possible in the present invention. Specifically, the present invention may be applied to a system including plural apparatuses and may be applied to an apparatus including one device.

The present invention includes software programs (in the embodiments, computer programs corresponding to the flowcharts shown in FIGS. 6, 7, 10 and 11) for realizing the functions of the embodiments supplied to a system or an apparatus directly or from a distance. The present invention also includes the supplied program code read out and executed by a computer of the system or the apparatus.

Therefore, the program code itself installed in the computer in order to realize the functional processing of the present invention with the computer also realizes the present invention. In other words, the present invention also includes a computer program itself for realizing the functional processing of the present invention.

In that case, as long as the computer program has a function of a computer program, the computer program may be provided in a form of an object code, a computer program executed by an interpreter and script data supplied to an OS.

As a recording medium for supplying the computer program, there are, for example, a floppy (registered trademark) disk, a hard disk, an optical disk, a magneto-optical disk, an MO, a CD-ROM, a CD-R and a CD-RW. Further, there are a magnetic tape, a nonvolatile memory card, a ROM and DVDs (a DVD-ROM and a DVD-R).

Besides, as a method of supplying the computer program, a client computer makes connection to a web page on the Internet using a browser of the client computer. The computer program of the present invention can also be supplied by downloading the computer program itself or a file compressed and including an automatic install function from the web page to a recording medium such as a hard disk.

The functional processing of the present invention can also be realized by dividing the program code configuring the computer program of the present invention into plural files and downloading the respective files from different web pages. In other words, a WWW server that causes plural users to download a program file for realizing the functional processing of the present invention with the computer is also included in the present invention.

The computer program of the present invention is encrypted, stored in a storage medium such as a CD-ROM and distributed to users. A user who clears a predetermined condition is allowed to download key information for decryption from a web page via the Internet. The functional processing of the present invention can be realized by executing, using the downloaded key information, the encrypted computer program and installing the computer program in the computer.

The functions of the embodiments described above are realized by the computer executing the readout computer program. Besides, an OS or the like running on the computer performs a part of or the entire actual processing based on an instruction of the computer program. The functions of the embodiments can also be realized by the processing.

The computer program read out from the recording medium is written in a memory included in a function extended board inserted in the computer or a function extended unit connected to the computer. Thereafter, a CPU or the like included in the function extended board or the function extended unit performs a part of or the entire actual processing based on an instruction of the computer program. The functions of the embodiments are also realized by the processing.

All of the embodiments described above merely indicate examples of materialization in carrying out the present invention. The technical scope of the present invention should not be limitedly interpreted by the embodiments. In other words, the present invention can be carried out in various forms without departing from the technical idea or the main characteristics thereof.

The present invention has been described with reference to the several exemplary embodiments. However, the present invention is not limited to the embodiments. It is evident that various modifications and applications are possible within the scope of claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-149796, filed Jun. 6, 2008, which is hereby incorporated by reference herein in its entirety.

What is claimed is:

1. A document management system comprising:
a shortcut generation unit configured to generate a shortcut of a document;
an identifier generation unit configured to generate an identifier for identifying the shortcut generated by the shortcut generation unit;
a storing unit configured to store the identifier generated by the identifier generation unit and use restriction information concerning use restriction of the document in a storage medium in association with each other;
a setting unit configured to set, in the shortcut generated by the shortcut generation unit, the identifier generated by the identifier generation unit and a destination mail address concerning a destination of the shortcut;
a transmitting unit configured to transmit a mail attached with the shortcut, in which the identifier and the destination mail address are set by the setting unit, to the destination;
a receiving unit configured to receive the mail attached with the shortcut in which the identifier and the destination mail address are set;
an activating unit configured to activate the shortcut attached to the mail received by the receiving unit;
an acquiring unit configured to acquire the use restriction information stored by the storing unit in association with the identifier set in the shortcut activated by the activating unit;
an individual-mail-address acquiring unit configured to acquire an individual mail address set in a mailer;
a determining unit configured to determine whether the individual mail address acquired by the individual-mail-address acquiring unit coincides with the destination mail address set in the shortcut activated by the activating unit, and to determine, based on the use restriction information acquired by the acquiring unit, whether use of the document linked to the shortcut activated by the activating unit is restricted; and
a permitting unit configured to permit an access to the document linked to the shortcut activated by the activating unit in a case that the determining unit determines that the individual mail address coincides with the destination mail address set in the shortcut activated by the activating unit and that the use of the document is not restricted.

2. The document management system according to claim 1, further comprising
an authenticating unit configured to perform, when the shortcut is activated by the activating unit, authentication of a user who instructs the activation,
wherein the determining unit determines, after the user is authenticated by the authenticating unit, whether the individual mail address acquired by the individual-mail-address acquiring unit coincides with the destination mail address set in the shortcut activated by the activating unit.

3. The document management system according to claim 1, wherein
the determining unit further determines whether a user who instructs the activation of the shortcut by the activating unit has an access right to the document linked to the shortcut, and
wherein the determining unit determines, after the determining unit determines that the user does not have the access right, whether the individual mail address acquired by the individual-mail-address acquiring unit coincides with the destination mail address set in the shortcut activated by the activating unit.

4. The document management system according to claim 1, wherein the use restriction information is a number of times of access to the document or a use period of the document.

5. A document management method comprising:
generating a shortcut of a document;
generating an identifier for identifying the generated shortcut;
storing the generated identifier and use restriction information concerning use restriction of the document in a storage medium in association with each other;
setting, in the generated shortcut, the generated identifier and a destination mail address concerning a destination of the shortcut;
transmitting a mail attached with the shortcut, in which the identifier and the destination mail address are set, to the destination;
receiving the mail attached with the shortcut in which the identifier and the destination mail address are set;

activating the shortcut attached to the received mail;

acquiring the use restriction information stored in association with the identifier set in the activated shortcut;

acquiring an individual mail address set in a mailer;

determining whether the acquired individual mail address coincides with the destination mail address set in the activated shortcut, and determining, based on the acquired use restriction information, whether use of the document linked to the activated shortcut is restricted; and permitting an access to the document linked to the activated shortcut in a case that it is determined that the individual mail address coincides with the destination mail address set in the activated shortcut and that the use of the document is not restricted.

6. A non-transitory computer-readable medium storing a computer program, the computer program causing a computer to execute:

generating a shortcut of a document;

generating an identifier for identifying the generated shortcut;

storing the generated identifier and use restriction information concerning use restriction of the document in a storage medium in association with each other;

setting, in the generated shortcut, the generated identifier for identifying the generated shortcut and a destination mail address concerning a destination of the shortcut;

providing an instruction to transmit a mail attached with the shortcut, in which the identifier and the destination mail address are set, to the destination;

activating the shortcut attached to the mail;

acquiring the use restriction information stored in association with the identifier set in the activated shortcut;

acquiring an individual mail address set in a mailer;

determining whether the acquired individual mail address coincides with the destination mail address set in the activated shortcut, and determining, based on the acquired use restriction information, whether use of the document linked to the activated shortcut is restricted; and permitting an access to the document linked to the activated shortcut in a case that it is determined that the individual mail address coincides with the destination mail address set in the activated shortcut and that the use of the document is not restricted.

7. A document management system comprising:

a shortcut generation unit configured to generate a shortcut of a document;

a storing unit configured to store use restriction information concerning use restriction of the document in a storage medium;

a setting unit configured to set, in the shortcut generated by the shortcut generation unit, a destination mail address concerning a destination of the shortcut; and a transmitting unit configured to transmit a mail attached with the shortcut, in which the destination mail address is set by the setting unit, to the destination, wherein an apparatus that receives the mail attached with the shortcut comprises:

an activating unit configured to activate the shortcut attached to the mail received by the receiving unit;

an acquiring unit configured to acquire the use restriction information stored by the storing unit;

an individual-mail-address acquiring unit configured to acquire an individual mail address set in a mailer;

a determining unit configured to determine whether the individual mail address acquired by the individual-mail-address acquiring unit coincides with the destination mail address set in the shortcut activated by the activating unit, and to determine, based on the use restriction information acquired by the acquiring unit, whether use of the document linked to the shortcut activated by the activating unit is restricted; and a permitting unit configured to permit an access to the document linked to the shortcut activated by the activating unit in a case that the determining unit determines that the individual mail address coincides with the destination mail address set in the shortcut activated by the activating unit and that the use of the document is not restricted.

* * * * *